United States Patent
Fan et al.

(10) Patent No.: US 9,100,576 B2
(45) Date of Patent: Aug. 4, 2015

(54) CAMERA POSITIONING TOOL FOR SYMBOLOGY READING

(75) Inventors: Zhigang Fan, Webster, NY (US);
Yonghui Zhao, Penfield, NY (US);
Shen-ge Wang, Fairport, NY (US);
Hengzhou Ding, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 8 days.

(21) Appl. No.: 13/459,790

(22) Filed: Apr. 30, 2012

(65) Prior Publication Data

US 2013/0140356 A1    Jun. 6, 2013

Related U.S. Application Data

(60) Provisional application No. 61/566,907, filed on Dec. 5, 2011.

(51) Int. Cl.

| | |
|---|---|
| *G06F 17/00* | (2006.01) |
| *H04N 5/232* | (2006.01) |
| *G06K 7/14* | (2006.01) |
| *G06K 9/32* | (2006.01) |
| *G06K 9/62* | (2006.01) |

(52) U.S. Cl.
CPC .......... *H04N 5/23293* (2013.01); *G06K 7/1452* (2013.01); *H04N 5/23222* (2013.01); *G06K 9/3241* (2013.01); *G06K 9/6204* (2013.01)

(58) Field of Classification Search
CPC ............ G06K 9/3241; H04N 1/00334; H04N 2201/3269; H04N 1/0044; H04M 2250/52
USPC .................. 235/454, 375, 462.01; 455/556.1
See application file for complete search history.

(56) References Cited

U.S. PATENT DOCUMENTS

| | | | |
|---|---|---|---|
| 5,659,167 A * | 8/1997 | Wang et al. ............... | 235/472.01 |
| 5,821,523 A * | 10/1998 | Bunte et al. ............... | 235/472.01 |
| 7,303,131 B2 | 12/2007 | Carlson et al. | |
| 2005/0121520 A1* | 6/2005 | Yamaguchi et al. ..... | 235/462.09 |
| 2007/0090190 A1* | 4/2007 | Kuromatsu et al. ........... | 235/454 |
| 2007/0183652 A1* | 8/2007 | Backstrom et al. ........... | 382/154 |
| 2007/0228174 A1 | 10/2007 | Vinogradov et al. | |
| 2009/0190831 A1 | 7/2009 | Van Der Putten | |
| 2009/0212113 A1 | 8/2009 | Chiu et al. | |
| 2010/0130250 A1* | 5/2010 | Choi .......................... | 455/556.1 |
| 2010/0163613 A1* | 7/2010 | Bucher et al. ................. | 235/375 |
| 2011/0007967 A1 | 1/2011 | Soderberg et al. | |
| 2011/0090252 A1 | 4/2011 | Yoon et al. | |
| 2011/0091092 A1 | 4/2011 | Nepomniachtchi et al. | |
| 2013/0155474 A1 | 6/2013 | Roach et al. | |

OTHER PUBLICATIONS

Yang Chen Zhaoxuan Yang Zhuofu Bai Jiapeng Wu, Simultaneous REal-time Segmentation of Diversified Barcode Symbols in Complex Background. IEEE, 2008. pp. 527-530.*
Girod et al., "Mobile Visual Search", IEEE Signal Processing Magazine, Special Issue on Mobile Media Search, pp. 1-11.

(Continued)

*Primary Examiner* — Thien M Le
*Assistant Examiner* — Asifa Habib
(74) *Attorney, Agent, or Firm* — Fox Rothschild LLP

(57) ABSTRACT

A method and device for receiving an image of a symbology captured by an imaging device, displaying an image of the symbology, displaying a boundary indicator around the symbology, adjusting the image size to correspond with the boundary indicator, decoding the symbology, and initiating an action by device.

19 Claims, 5 Drawing Sheets

(56) References Cited

OTHER PUBLICATIONS

Hull et al., "Paper-Based Augmented Reality", 17th International Confernece on Artificial Reality and Telexistence 2007, pp. 205-209.

Chen et al., "Streaming Mobile Augmented Reality on Mobile Phones", IEEE International Symposium on Mixed and Augmented Reality 2009 Science and Technology Proceedings, Oct. 19-22, Orlando, Florida, pp. 181-182.

* cited by examiner

CAMERA POSITIONING TOOL FOR SYMBOLOGY READING

RELATED APPLICATION

This application hereby claims priority under 35 U.S.C. §119 to U.S. Provisional Patent Application No. 61/566,907 filed Dec. 5, 2011, entitled "CAMERA POSITIONING TOOL FOR SYMBOLOGY READING," the disclosure of which is incorporated herein by reference.

BACKGROUND

Symbologies, such as matrix symbologies and two-dimensional barcodes, have become a widely accepted tool for sharing small amounts of data, and for tracking objects that are marked with the symbology. Examples of symbologies include Universal Product Codes (UPC), data matrix codes, Quick Response (QR) codes, Aztec code, Maxi code and the like.

A symbology may be scanned and read by a wide variety of devices, including, but not limited to, cellular telephones, digital cameras, smartphones, personal digital assistants, tablet devices, electronic readers, personal computers and portable satellite navigation devices.

The device used to scan the symbology may be limited by software and hardware components within the device. For example, the device may contain a camera lens that has a focal length that prevents the lens from accurately focusing on an object a short distance away. When such a limitation exists, a user holding the device too closely to the symbology may not be able to properly focus upon the symbology.

In addition, most QR codes have an area of about 2 cm×2 cm. However, it is sometimes desirable to use smaller codes, such as those having an area of about 0.75 cm×0.75 cm. Such codes are used on small packages and in other applications where the larger variant is not feasible due to space constraints. For such codes, the user may tend to move the electronic device closer to the code in an attempt to get a reading. This may often be in a range where the camera may be unable to focus upon or properly read the code.

Accordingly, it would be beneficial to provide systems and methods that present solutions to this problem, and may also provide additional benefits.

SUMMARY

In an embodiment, a method may include receiving an image of a symbology by utilizing an image capture module and imaging device on an electronic device. The image of the symbology may be displayed upon the display of the electronic device, which may also be shown in conjunction with a boundary indicator that corresponds to a size of the symbology. When the boundary indicator matches the boundary of the displayed image, the symbology may be decoded to yield decoded information, and the decoded information may be used to initiate an action on the electronic device.

In another embodiment, an electronic device may include an imaging device, a processor, a display, and a computer-readable memory, which may further contain a symbology scanning or reading application. The application may have programming instructions that may instruct the processor to cause the imaging device to receive an image of the symbology, may cause the display to display the image of the symbology, may cause the display to display a boundary indicator that may correspond to a symbology size, may determine whether the boundary indicator corresponds to a boundary of the displayed image, may decode the symbology to yield decoded information when the boundary indicator corresponds to the boundary of the displayed image, and may use the decoded information to initiate an action by the device.

DETAILED DESCRIPTION

Figure 1:
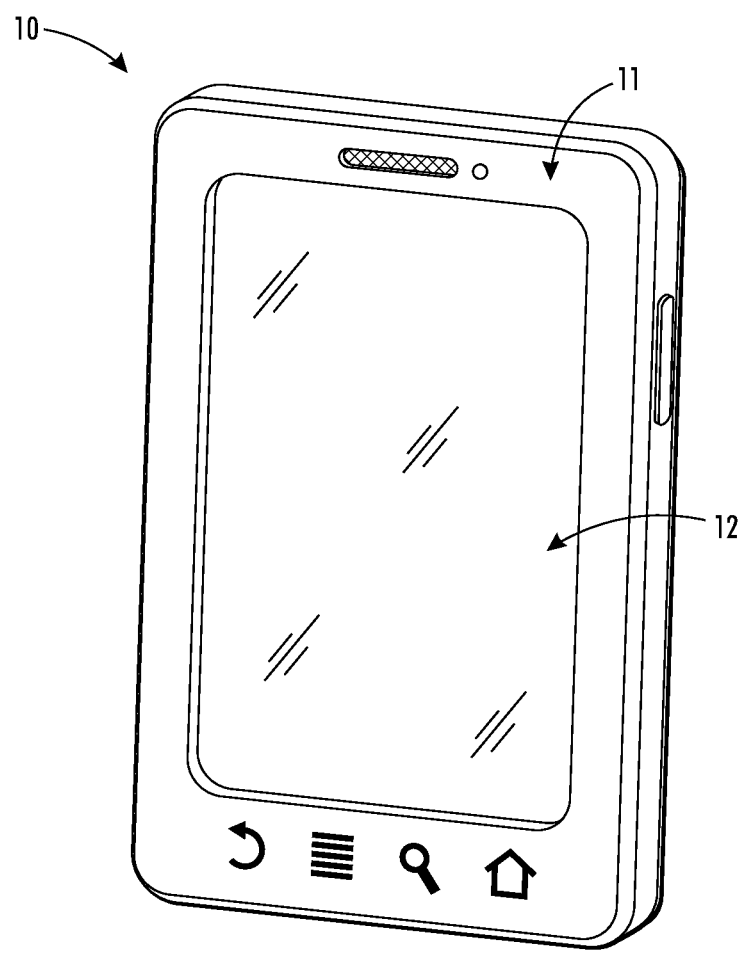
FIG. 1 depicts a first or front face of an electronic device that includes a symbology imager.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this document, a "symbology" is a system of symbols that may be arranged in any manner upon a surface. The symbology may include, but is not limited to, one-dimensional barcodes, two-dimensional barcodes, or three-dimensional barcodes, and may be an optical, machine-readable representation of data. The symbology may be of any geometric shape or size. Examples of one-dimensional barcodes include Universal Product Code (UPC) symbols and the like. Examples of two-dimensional barcodes include data matrix codes, quick response (QR) codes, Aztec codes, Maxi codes and the like. The symbology may be printed on a substrate or displayed on an electronic display.

An "electronic device" refers to a device that includes an imaging device, a processor and tangible, computer-readable memory. The memory may contain programming instructions in the form of a software application that, when executed by the processor, causes the device to perform one or more barcode scanning operations according to the programming instructions. Examples of suitable devices include portable electronic devices such as smartphones, personal digital assistants, cameras, tablet devices, electronic readers, personal computers, media players, satellite navigation devices and the like.

An "imaging device" refers to any device capable of optically viewing an object and converting an interpretation of that object into electronic signals. One such example of an imaging device is a camera lens. An "image capture module"

refers to the software application and/or the image sensing hardware of an electronic device that is used to capture images of symbology such as barcodes and the like.

A "zoom factor" refers to a ratio of the diameter of the field of measurement captured by the imaging device to the diameter of an image shown in a display. A zoom factor may be expressed in terms of percentages, multiples, or the like. For example, a zoom factor of 400% or 4× would show an image in the display that is four times larger than the object it depicts in the field of measurement. The zoom factor may be altered in any number of ways, including, but not limited to, electronic means, mechanical means, software means, or any combination thereof.

FIG. 1 shows one such example of an electronic device, generally designated 10. The electronic device 10 may include a front face 11 and a display 12. The display 12 may be any suitable component for displaying images, including, but not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays. The display 12 may further include a touch sensitive screen, including, but not limited to, resistive touchscreens, capacitive touchscreens, and infrared touchscreens.

Figure 2:
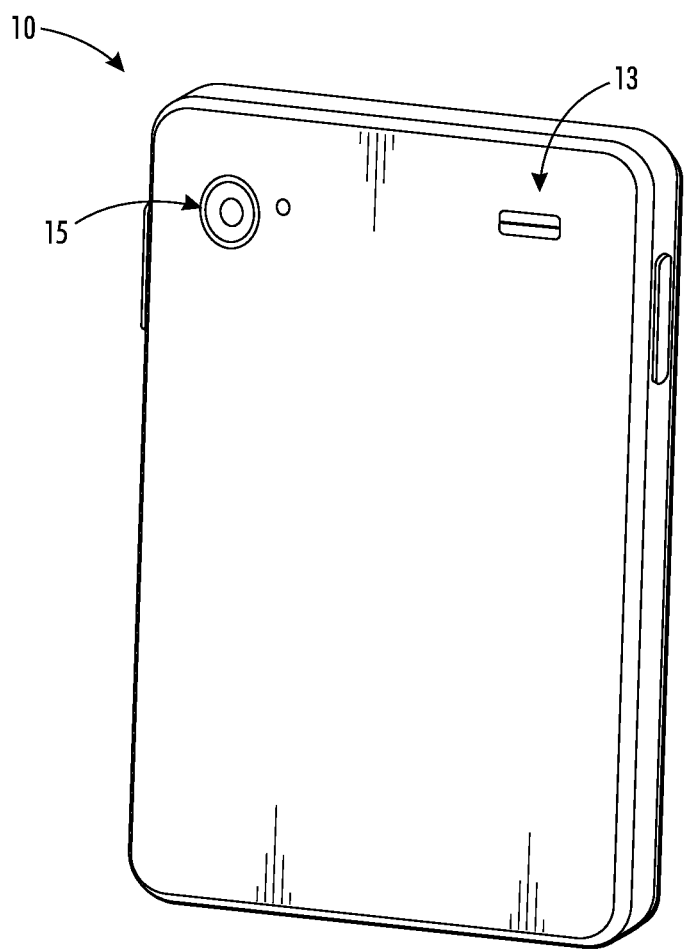
FIG. 2 depicts a second or rear face of an electronic device that includes a symbology imager.

FIG. 2 shows a rear face 13 of electronic device 10. The rear face 13 may include an imaging device 15. The imaging device 15 may be any suitable component capable of receiving an optical image and transmitting the information to other components for processing.

The imaging device may further have an ability to adjust its focal length and aperture in such a manner that would allow it to zoom and properly focus upon an intended object to be imaged. This adjustment may define an "optimal focal distance," or a range of distances in which the electronic device 10 may be properly positioned from the intended object to be imaged to achieve a clear image.

While the imaging device 15 is depicted on the rear face of the present example, persons skilled in the art will appreciate that the imaging device 15 may be positioned at any location upon any face of the electronic device 10, or may even be external to the electronic device 10 and connected by any means of electronic communication, including, but not limited to, physical cable communication such as universal serial bus (USB), wireless radio communication, wireless light communication, or near field communication technology.

In some embodiments, the display 12 may be positioned within the electronic device 10, and may be configured in such a way so as to display the output of the imaging device 15 in real time so that the user may view the display 12 and see the output of the imaging device 15 on the display.

Accordingly, the configuration of the electronic device 10 as shown in FIGS. 1 and 2 is only an example, and persons skilled in the art will appreciate other configurations that are able to achieve a similar overall result.

Figure 3:
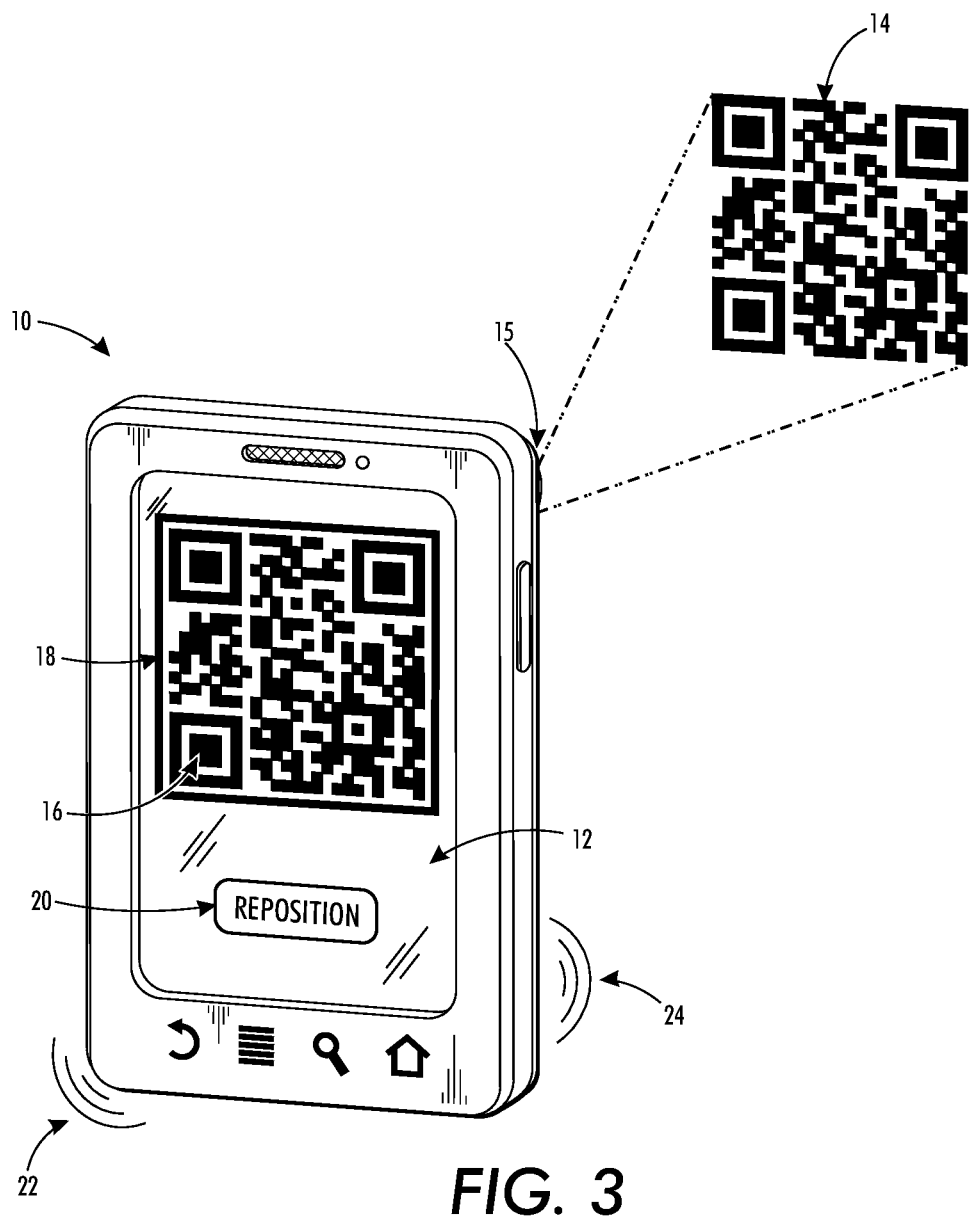
FIG. 3 depicts an electronic device as it is reading the symbology and displaying the image on the screen.

The electronic device 10 may be used to image a symbology 14, as shown in FIG. 3. The electronic device 10 may be positioned so that the imaging device 15 is facing the symbology 14 desired to be imaged. The imaging device 15 may be activated to view the symbology 14, wherein the electronic device 10 may process and transmit an image 16 depicting the symbology 14 upon the display 12 by use of an image capture module. A boundary indicator 18 may also be shown on the display 12.

The size of the image 16 may be increased by moving the electronic device 10 closer to the symbology 14. Similarly, the size of the image 16 may be decreased by moving the electronic device 10 farther away from the symbology 14.

As an alternative to moving the electronic device 10 with respect to the symbology 14, the imaging device 15 may be adjusted by mechanical, electronic, or software means to alter the focal length and aperture of the imaging device 15 to zoom in or out to achieve a desired size for the image 16. Similarly, the imaging device 15 may be adjusted by mechanical, electronic, or software means to focus upon the symbology 14 to ensure that the image 16 presented upon the display 12 is crisp, easily viewable and not blurry.

As another alternative to the above, the size of the image 16 may be increased or decreased by varying a zoom factor of the imaging device 15. Whereupon a user alters the zoom factor, the size of the boundary indicator 18 may be adjusted in a proportional manner.

Figure 4A:
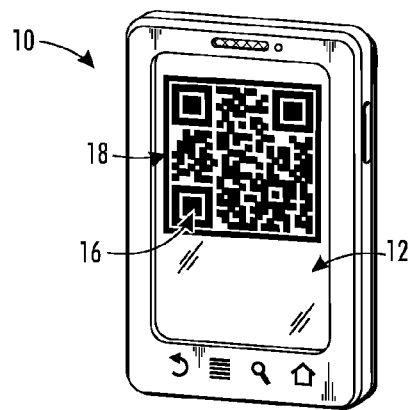
FIG. 4A depicts an example of a boundary indicator about a displayed symbology image.
Figure 4B:
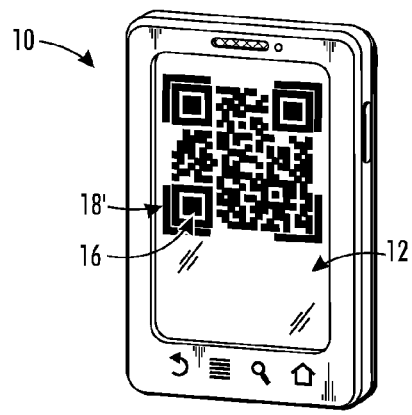
FIG. 4B depicts a second example of a boundary indicator about a displayed symbology image.
Figure 4C:
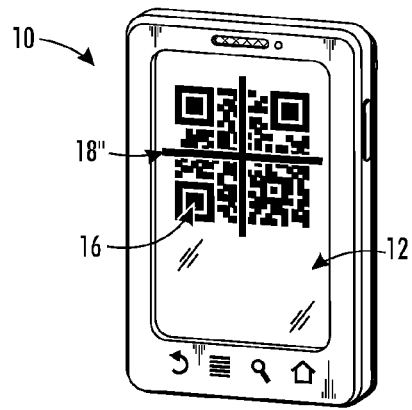
FIG. 4C depicts a third example of a boundary indicator about a displayed symbology image.

The boundary indicator 18 is a graphical representation of the optimal focal distance that can be achieved by the imaging device 15, and is displayed on the display 12 in such a manner that it can be used as a tool by the user or the software application loaded onto the electronic device 10. The boundary indicator 18 may further be generated by the software application. The boundary indicator 18 may be of a fixed or variable size, and may be positioned at any suitable location upon the display 12. Furthermore, the boundary indicator 18 may be of any suitable shape and size that is capable of matching the shape and size of the symbology 14 being imaged. For example, FIG. 4A depicts a quadrilateral boundary indicator 18 surrounding the image 16. FIG. 4B depicts a boundary indicator 18' that surrounds the image 16 and is quadrilateral in shape, but only displays the corners and omits the center portions joining each corner together. FIG. 4C depicts a crosshair-style boundary indicator 18" that is laid over the image 16.

The matching process between the boundary indicator 18 and the boundary of the symbology 14 being imaged may involve moving the imaging device or adjusting its zoom until the display shows the boundary indicator 18 overlapping on the boundary of the image 16, or vice versa. For example, the device may automatically increase or decrease an optical or digital zoom setting for its lens until the boundary of the image 16 corresponds to the boundary indicator 18 on the display. Alternatively, the user may be instructed to reposition the electronic device 10 so as to change the dimensions of the boundary of the displayed image 16. The corresponding sizes of the boundary indicator 18 and the boundary of the image 16 may be an exact match, or may fall within an acceptable size range as determined by the software program. Such an acceptable size range may allow the boundary indicator 18 to be a certain size larger or smaller than the boundary of the displayed image 16, and still be deemed to "correspond" with or "match" the displayed image boundary. The software program may also deem the boundary indicator 18 and the boundary of the image 16 to be an "exact match" even when the boundary indicator 18 appears just outside or just inside of the image boundary. For example, a match may occur when the boundary indicator 18 has an edge that is positioned to overlap with, or within a minimum distance from, the boundary of the image 16.

The boundary of the image 16 may be determined by the software application by sensing edges of the symbology 14. The edges may be sensed by the program by detecting white space around the symbology 14 or using points within the symbology 14, such as the positioning squares typically seen in the corners of QR codes (as shown in the top corners and bottom left corner of symbology 14 in FIG. 3). The edges may also be sensed by recognition of foreign objects or symbols not associated with the symbology being scanned.

The boundary indicator 18 may serve the purpose of ensuring that the image 16 is viewable by the user and clearly in focus so that the symbology 14 depicted by the image 16 is capable of being read and decoded by the software application. When the image 16 is not clear or viewable, the software application may be triggered to adjust settings or communicate to the user as described below until the image is clearly displayed.

Referring to FIG. 3, a software application may be programmed to generate the boundary indicator 18 and output it on the display 12. The size and dimension of the boundary indicator 18 may be stored in a memory module on the electronic device 10, and may include a database, a system, or the like based upon known characteristics of the imaging device 15. Such characteristics may include focal length, aperture, use of a flash, or the like, or any combination thereof. Other characteristics that may affect the type of boundary indicator 18 selected by the software application may include known dimensions of common symbologies, ambient lighting characteristics, objects that may encroach upon the symbology 14, thus making it more difficult to image, noise produced by the imaging device 15, or an inability for the user to hold the electronic device 10 steady during the process. Furthermore, the boundary indicator 18 may be calculated by the software application based on the above characteristics when a specified boundary indicator 18 cannot be not found in the database. The software program may further be able to store such calculations in the database for future retrieval.

If the size of the symbology 14 is not found in the database, the software application may estimate the symbology 14 size by detecting it from the image 16 as captured and calculating the size based upon detection. Detection may be achieved by many methods of detection, including, but not limited to a generalized Hough Transform. Once the symbology 14 is detected, the distance and zoom factor between the imaging device 15 and the symbology 14 are recorded, and the size may be calculated by any number of calculations. One such calculation may be $$\text{Barcode\_size} = \frac{\text{Barcode\_image\_size} \times \text{Train\_barcode\_size}}{\text{Train\_barcode\_image\_size}(\text{distance, zoom})},$$

where Barcode_size and Barcode_image_size are the physical size of the barcode, and its image size, respectively. Similarly, Train_barcode_size/Train_barcode_image_size are the physical size of the barcode used in training, and its image size (under the same distance and zoom conditions), respectively. Distance and zoom are the parameters obtained from the second step.

If the imaging device 15 is unable to properly view the symbology 14, the software application may notify the user to reposition the device 10 in such a way that the imaging device 15 is able to properly zoom or focus upon the symbology 14. Such a notification may be a text box or image 20 shown upon the display 12, audio signals 22, haptic feedback 24 and the like, or any combination thereof.

Figure 5:
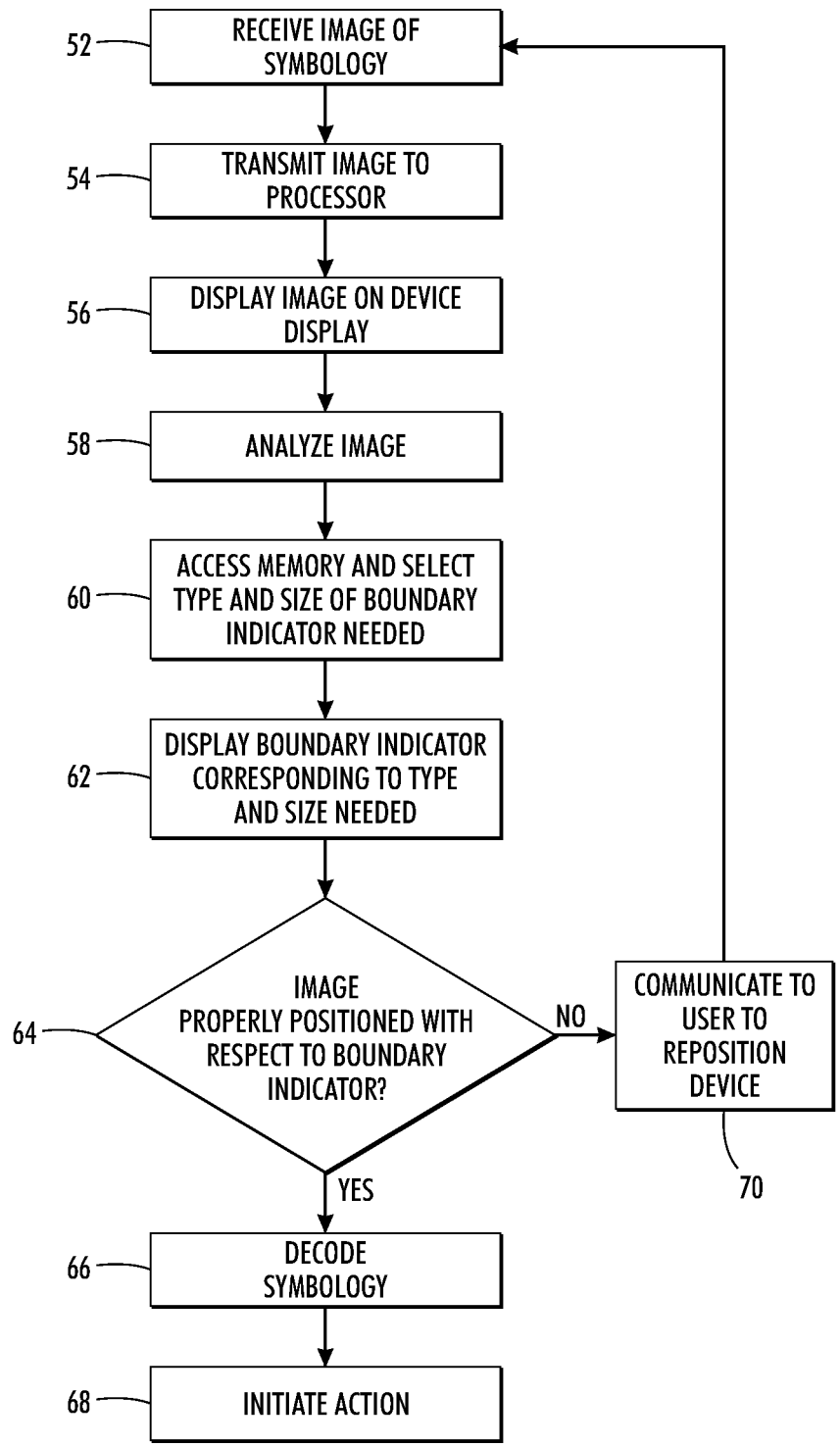
FIG. 5 depicts a flow chart example of a process for receiving an image of a symbology and positioning an electronic device to properly decode the symbology.

A process of positioning and imaging symbology is depicted in FIG. 5, generally designated 50. A first step may be to receive an image of a symbology 52 by use of an electronic device and an imaging device. The imaging device may transmit the image received to a processor 54, where it may be processed, adjusted and presented on a display 56 where it is viewable by the user. The processor may analyze the image 58 and access a database in memory to determine and select what type of boundary indicator is useful or necessary to match at least a portion of the shape and/or size of the displayed image 60. The boundary indicator may be selected from a range of possibilities stored in memory, and may be transmitted to the display to be shown along with the image 62. If the process of selecting a boundary indicator and adjusting the image to match the boundary indicator is successful 64, the symbology may be decoded 66 and an action may be initiated 68. If the process is not successful, the processor may present a form of communication to the user to reposition the device 70 so that the process can start over by receiving an image 52. The process may be repeated as many times as necessary to achieve a match between the boundary indicator and the boundary of the image on the display, so that the image is properly focused and can be properly decoded.

The process of initiating an action 68 may include any number of actions that are capable of being performed on the electronic device. Examples of such actions may include using a browser to connect to a website, starting a software application, playing a media file, displaying decoded information, or any combination thereof.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method, comprising:
    by an image capture module of an electronic device, receiving an image of a symbology captured by an imaging device of the electronic device;
    on a display of the electronic device, displaying the image of the symbology;
    by a processor, selecting a boundary indicator that represents an optimal focal distance of the imaging device, wherein the selected boundary indicator corresponds to a size and a type of the symbology;
    on the display, displaying the boundary indicator as a graphical representation of a distance from the symbology at which the electronic device may be positioned to achieve a clear image;
    determining whether the boundary indicator corresponds to a boundary of the displayed image of the symbology by determining whether corresponding sizes of the boundary indicator and the boundary of the displayed image fall within an acceptable size range that allows the boundary indicator to be a certain size larger and a certain size smaller than the boundary of the displayed image of the symbology;
    if the boundary indicator does not correspond to the boundary of the displayed image, automatically adjusting a focal length and aperture of the image capture module until the boundary indicator corresponds to the boundary of the displayed image;
    when the boundary indicator corresponds to a boundary of the displayed image, decoding the symbology to yield decoded information; and
    using the decoded information to initiate an action by the imaging device.

2. The method of claim 1, further comprising on the display, adjusting a size of the displayed image based on a location of the electronic device.

3. The method of claim 2, wherein the adjusting may be achieved by means of repositioning the electronic device with respect to the symbology.

4. The method of claim 1, further comprising on the display, adjusting a size of the boundary indicator based on a zoom factor of the imaging device.

5. The method of claim 4, wherein the adjusting may be achieved by scaling the size of the boundary indicator by an amount that is proportional to the zoom factor of the imaging device.

6. The method of claim 1, wherein the action comprises one or more of the following:
 using a browser to connect to a website;
 starting an application;
 playing a media file; and
 displaying, on the display, the decoded information.

7. The method of claim 1, wherein the boundary indicator includes a plurality of edges whose position corresponds to a position of a plurality of edges of the symbology when the electronic device is positioned within an optimal focal distance from the symbology.

8. An electronic device, comprising:
 an imaging device;
 a computer-readable memory;
 a processor;
 a display; and
 a computer-readable memory containing a symbology scanning application comprising programming instructions that instruct the processor to:
  cause the imaging device to receive an image of a symbology;
  cause the display to display the image of the symbology;
  select a boundary indicator that represents an optimal focal distance of the imaging device, wherein the selected boundary indicator corresponds to a size and a type of the symbology;
  cause the display to display the boundary indicator as a graphical representation of a distance from the symbology at which the imaging device may be positioned to achieve a clear image;
  determine whether the boundary indicator corresponds to a boundary of the displayed image of the symbology by determining whether corresponding sizes of the boundary indicator and the boundary of the displayed image fall within an acceptable size range that allows the boundary indicator to be a certain size larger and a certain size smaller than the boundary of the displayed image;
  if the boundary indicator does not correspond to the boundary of the displayed image, automatically adjust a focal length and aperture of the image capture module until the boundary indicator corresponds to the boundary of the displayed image;
  decode the symbology to yield decoded information when the boundary indicator corresponds to the boundary of the displayed image; and
  use the decoded information to perform an action by the imaging device.

9. The electronic device of claim 8, wherein the programming instructions further instruct the processor to adjust a size of the boundary indicator based on a zoom factor of the imaging device.

10. The electronic device of claim 9, wherein the adjusting comprises notifying a user to reposition the electronic device with respect to the symbology.

11. The electronic device of claim 9, wherein the adjusting comprises scaling the size of the boundary indicator by an amount that is proportional to the zoom factor of the imaging device.

12. The electronic device of claim 8, wherein the programming instructions that instruct the processor to use the decoded information to perform the action comprises instructions to initiate one or more of the following:
 using a browser to connect to a website;
 playing a media file; and
 displaying, on the display, the decoded information.

13. The electronic device of claim 8, wherein the boundary indicator includes a plurality of edges whose position corresponds to a position of a plurality of edges of the symbology when the electronic device is positioned within an optimal focal distance from the symbology.

14. A device comprising a non-transitory computer readable storage medium, having stored thereon instructions that, when executed, instruct a processor of an electronic device to implement a method, wherein the electronic device includes an imaging device, a processor, and a display, the method comprising:
 causing the imaging device to receive an image of a symbology;
 causing the display to display the image of the symbology;
 selecting a boundary indicator that represents an optimal focal distance of the imaging device, wherein the selected boundary indicator corresponds to a size and a type of the symbology and comprises a graphical representation of a distance from the symbology at which the imaging device may be positioned to achieve a clear image;
 causing the display to display the boundary indicator;
 determining whether the boundary indicator corresponds to a boundary of the displayed image of the symbology by determining whether corresponding sizes of the boundary indicator and the boundary of the displayed image fall within an acceptable size range that allows the boundary indicator to be a certain size larger and a certain size smaller than the boundary of the displayed image;
 if the boundary indicator does not correspond to the boundary of the displayed image, automatically adjusting a focal length and aperture of the image capture module until the boundary indicator corresponds to the boundary of the displayed image,
 decoding the symbology to yield decoded information when the boundary indicator corresponds to the boundary of the displayed image; and
 using the decoded information to perform an action by the imaging device.

15. The device of claim 14, wherein the method further comprises adjusting a size of the boundary indicator based on a zoom factor of the imaging device.

16. The device of claim 15, wherein the adjusting comprises notifying a user to reposition the electronic device with respect to the symbology.

17. The device of claim 15, wherein the adjusting comprises scaling the size of the boundary indicator by an amount that is proportional to the zoom factor of the imaging device.

18. The device of claim 14, wherein the using the decoded information to perform the action further comprises instructing the processor to initiate one or more of the following:
 using a browser to connect to a website;
 playing a media file; and
 displaying, on the display, the decoded information.

19. The device of claim 14, wherein the boundary indicator includes a plurality of edges whose position corresponds to a position of a plurality of edges of the symbology when the electronic device is positioned within an optimal focal distance from the symbology.

* * * * *